United States Patent
Patera

(10) Patent No.: US 8,676,407 B1
(45) Date of Patent: Mar. 18, 2014

(54) ENERGY-ANGULAR MOMENTUM DIAGNOSTIC METHOD FOR LAUNCH VEHICLE PERFORMANCE

(71) Applicant: The Aerospace Corporation, El Segundo, CA (US)

(72) Inventor: Russell Paul Patera, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 13/746,307

(22) Filed: Jan. 22, 2013

(51) Int. Cl.
- *G01C 23/00* (2006.01)
- *G05D 1/00* (2006.01)
- *G05D 3/00* (2006.01)
- *G06F 7/00* (2006.01)

(52) U.S. Cl.
USPC ............. 701/3; 701/5; 701/6; 701/13; 701/14

(58) Field of Classification Search
USPC .......................................... 701/3, 5, 6, 14, 13
See application file for complete search history.

(56) References Cited

U.S. PATENT DOCUMENTS

| | | | | |
|---|---|---|---|---|
| 3,305,671 A | * | 2/1967 | Manoni, Jr. | 701/400 |
| 3,350,548 A | * | 10/1967 | Whitaker | 700/30 |
| 3,940,096 A | * | 2/1976 | Keigler et al. | 244/165 |
| 4,275,861 A | * | 6/1981 | Hubert | 244/165 |
| 4,536,843 A | * | 8/1985 | Lambregts | 701/3 |
| 5,042,752 A | * | 8/1991 | Surauer et al. | 244/164 |
| 6,062,513 A | * | 5/2000 | Lambregts | 244/175 |

OTHER PUBLICATIONS

Russell P. Patera, "Energy-Angular Momentum Plane Guidance Algorithm," Published by American Astronautical Society (2003).*
Notice of Allowance issued in U.S. Appl. No. 13/760,189 on Jul. 17, 2013.

* cited by examiner

*Primary Examiner* — Khoi Tran
*Assistant Examiner* — Jorge Peche
(74) *Attorney, Agent, or Firm* — LeonardPatel PC

(57) ABSTRACT

Novel diagnostic methods for performance of a launch vehicle are disclosed. A method may include computing energy for a pre-flight trajectory of a vehicle using angular momentum of the vehicle, and comparing a difference in energy between the energy for the pre-flight trajectory of the vehicle and energy for a flight trajectory of the vehicle.

22 Claims, 12 Drawing Sheets

US 8,676,407 B1

ENERGY-ANGULAR MOMENTUM DIAGNOSTIC METHOD FOR LAUNCH VEHICLE PERFORMANCE

FIELD

The present invention relates to diagnostic methods and, more particularly, to diagnostic methods for performance of a launch vehicle (hereinafter "vehicle").

BACKGROUND

Generally, after a vehicle is launched, it is important to identify issues that can affect subsequent launches to mitigate risk of future failure or anomalies. In many cases, assessments are made by comparing flight telemetry data to mission requirements or vehicle family histories. The times of key events are compared to pre-flight predictions. In addition, state vectors at key events are also compared to predictions.

Since event times typically do not agree, comparing other vehicle parameters at various time points becomes difficult or impossible. The lack of a single independent trajectory parameter where comparisons can be made between flight and pre-flight trajectories makes the assessments very challenging for flights having anomalies.

After the assessment, a complete post-flight analysis is conducted for each flight discipline, and a particular activity is focused in areas having anomalous flight data. In some cases, simulation tools can be used to duplicate an anomalous flight event. In other cases, trajectory simulations are used to reconstruct the flight trajectory to show that the flown trajectory was in the family of possible trajectories based on known vehicle or environmental dispersions.

However, this process can be time consuming, expensive, and, in some cases, can lead to ambiguous results. The problem is difficult because flight trajectory time does not match pre-flight predictions due to dispersions and no independent parameter is available to replace time. In addition, the number of parameters to be analyzed is large, and anomalies in one area can affect what happens in another area.

Accordingly, novel diagnostic methods, which may use total orbital angular momentum per unit mass, may be beneficial to compare a pre-flight trajectory with an in-flight trajectory to analyze performance of the vehicle.

SUMMARY

Certain embodiments of the present invention may provide solutions to the problems and needs in the art that have not yet been fully identified, appreciated, or solved by current diagnostic methods. For example, one or more embodiments pertain to a diagnostic method that may analyze vehicle performance using actual fight trajectory data and pre-flight trajectory predictions. For example, the method may use a vehicle's trajectory in the instantaneous energy-angular momentum plane where total energy (gravitational plus kinetic energy) per unit mass is plotted as a function of orbital angular momentum per unit mass.

In one embodiment, a computer-implemented method is provided. The computer-implemented method includes computing energy for a pre-flight trajectory of a vehicle using angular momentum of the vehicle, and comparing a difference in energy between the energy for the pre-flight trajectory of the vehicle and energy for a flight trajectory of the vehicle.

In another embodiment, a computer-implemented method is provided. The computer-implemented method includes computing pre-flight trajectory energy values that correspond to flight trajectory angular momentum values of a vehicle, and comparing a difference in energy values between the pre-flight trajectory energy values and flight trajectory energy values of the vehicle.

In yet another embodiment, an apparatus is provided. The apparatus includes at least one processor and memory including computer program code. The computer program code, together with the at least one processor, are configured to cause the apparatus to compute pre-flight trajectory energy values that correspond to flight trajectory angular momentum values of a vehicle, and compare a difference in energy values between the pre-flight trajectory energy values and flight trajectory energy values of the vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments pertain to a diagnostic method configured to analyze a vehicle performance using actual fight data and the pre-flight trajectory prediction. The method may use the vehicle's trajectory in the instantaneous energy-angular momentum plane where total energy (gravitational plus kinetic energy) per unit mass is plotted as a function of orbital angular momentum per unit mass. The desired optimized vehicle trajectory in the energy-angular momentum plane may begin at the launch point and end at the orbit injection point.

Throughout the launch trajectory, the energy is a continuous function of angular momentum. During flight, the actual trajectory of the launch vehicle must be very close to the optimized pre-flight trajectory for the vehicle to achieve the desired orbit. Differences of energy between the flight trajectory and pre-flight trajectory at given values of angular momentum provide an indication of flight performance, since any deviation from the optimized trajectory indicates suboptimal vehicle performance.

In addition to energy, differences in other orbit-related parameters, such as radial distance, velocity magnitude, apogee, perigee, etc., can be plotted as functions of orbital angular momentum. A person of ordinary skill in the art would readily appreciate that, when calculating the differences in other orbit-related parameters, a similar or same diagnostic method as described herein can be used. This information may identify performance issues associated with various vehicle systems, such as flight anomalies in propulsion, guidance, attitude control, etc.

The diagnostic method described herein may allow vehicle weight, staging events, jettison events, and time dispersions to be ignored. In addition, the diagnostic method may allow vehicle performance to be displayed as a continuous function of angular momentum rather than only at discrete events as is done using conventional methods. The speed at which vehicle performance assessment can be achieved using this method may be important and may provide an advantage for identification of issues that impact pending launches of similar vehicles.

Figure 1:
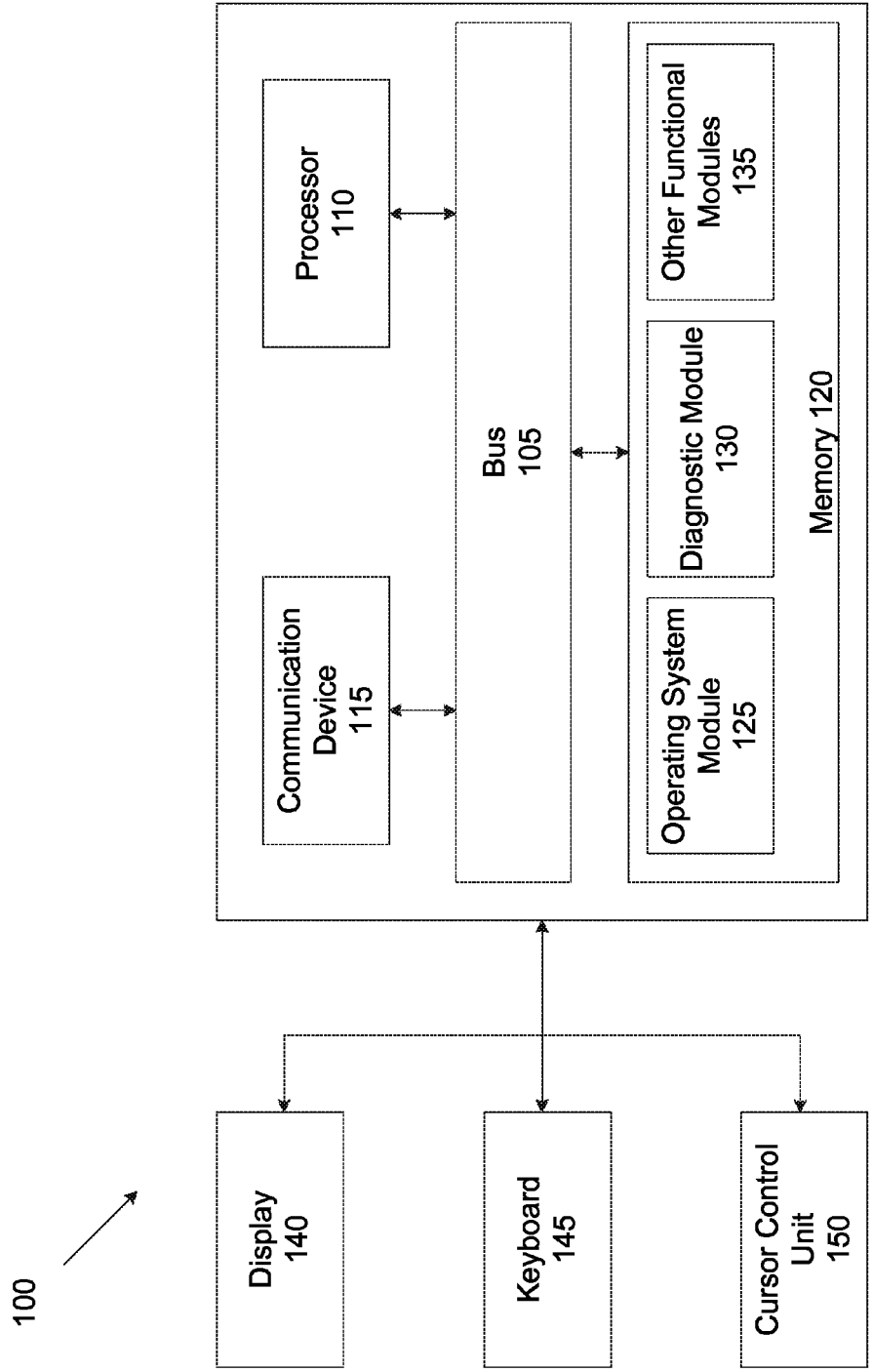
FIG. 1 illustrates a block diagram of a diagnostic system, according to an embodiment of the present invention.

FIG. 1 illustrates a block diagram of a diagnostic system 100, according to an embodiment of the present invention. Diagnostic system 100 may include a bus 105 or other communication mechanism that can communicate information and a processor 110, coupled to bus 105, that can process information. Processor 110 can be any type of general or specific purpose processor. Diagnostic system 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. Diagnostic system 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user, such as diagnostic information. A keyboard 145 and a cursor control unit 150, such as a computer mouse, may also be coupled to bus 105 to enable the user to interface with diagnostic system 100.

According to one embodiment, memory 120 may store software modules that may provide functionality when executed by processor 110. The modules can include an operating system 125 and a diagnostic module 130, as well as other functional modules 135. Operating system 125 may provide operating system functionality for diagnostic system 100. Because diagnostic system 100 may be part of a larger system, diagnostic system 100 may include one or more additional functional modules 135 to include the additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In this embodiment, diagnostic module 130 may use orbital angular momentum rather than time as an independent parameter to compare trajectory parameters of the vehicle. All trajectory parameters have unique values as functions of angular momentum for both pre-flight best estimate trajectory (or BET) and flight trajectory (or FT). This may allow flight trajectory parameters to be compared directly to best estimate trajectory parameters at the same values of orbital angular momentum. The use of angular momentum rather than time allows for the complexity of post flight assessment to be reduced because vehicle mass, staging, and jettison events are not taken into consideration.

The best estimate trajectory and flight trajectory can be represented by earth centered inertial ("ECI") position x(t)

and velocity v(t), respectively. At each time value t, the orbital angular momentum J per unit mass may be obtained by $$\vec{J} = \vec{R} \times \vec{V} \quad (1)$$
$$J(1) = x(2)*v(3) - x(3)*v(2)$$
$$J(2) = x(3)*v(1) - x(1)*v(3)$$
$$J(3) = x(1)*v(2) - x(2)*v(1)$$

where J(1), J(2), and J(3) are X, Y, and Z axis components of orbital angular momentum in the ECI. It should be appreciated that J(3), or Z-axis component of angular momentum J, points through the North Pole. The J(1) and J(2), or X-axis and Y-axis components of angular momentum J, are in the Earth's equatorial plane. Stated differently, equation 1 describes how to compute the angular momentum J based on a cross product of position x and velocity v of the vehicle. The magnitude of the orbital angular momentum $J_M$ may be given by $$J_M = \sqrt{J(1)^2 + J(2)^2 + J(3)^2} \quad (2)$$

The magnitudes of ECI position x(t) and velocity v(t) may be given by $$X_M = \sqrt{x(1)^2 + x(2)^2 + x(3)^2} \quad (3)$$

$$V_M = \sqrt{v(1)^2 + v(2)^2 + v(3)^2} \quad (4)$$

respectively. The total energy per unit mass, which includes both gravitational potential energy and kinetic energy, may be given by $$E = 0.5(V_M)^2 - \frac{GM}{X_M} \quad (5)$$

where G is the Universal Gravitational Constant and M is the mass of the Earth. Stated differently, the energy E obtained in this embodiment is with respect to the center of the Earth. It should be appreciated that equation 5 can be used by diagnostic module 130 to obtain the energy E for flight trajectory and the energy E for best estimate trajectory of the vehicle.

Figure 2:
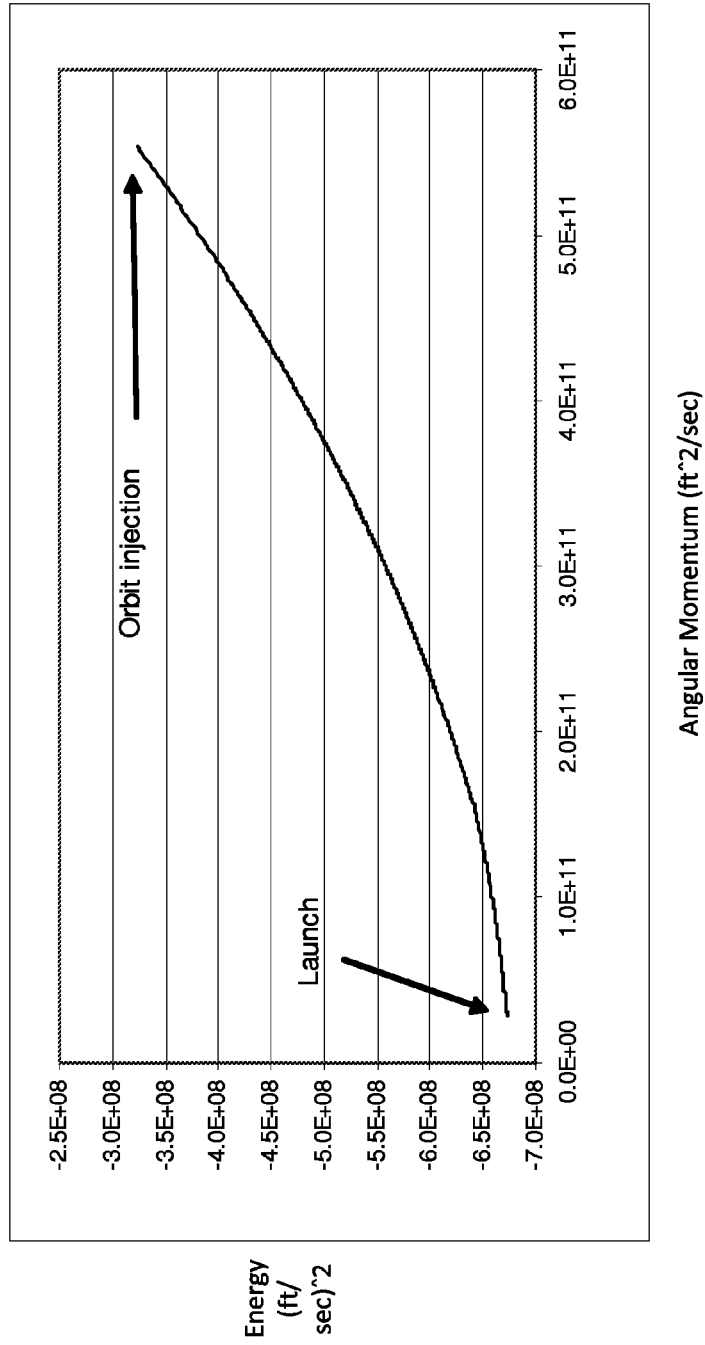
FIG. 2 is a graph illustrating total energy as a function of angular momentum magnitude, according to an embodiment of the present invention.

Energy E as a function of the magnitude of the orbital angular momentum $J_M$ may be described as a curve or trajectory in the instantaneous E-$J_M$ plane. For example, graph 200 of FIG. 2 illustrates the energy difference between flight trajectory and pre-flight trajectory. Graph 200 in this embodiment shows a vehicle launched, for example, from Cape Canaveral and targets a 160 by 120 nautical mile orbit inclined at 31.47 degrees.

The desired, optimized best estimate trajectory may be represented as $E_{BET}(J_M)$, while the actual realized flight trajectory may be represented as $E_{FT}(J_M)$. The energy difference between realized flight trajectory $E_{FT}(J_M)$ and the optimized best estimate flight trajectory $E_{BET}(J_M)$ may show the vehicle's performance as a function of the magnitude of the orbital angular momentum $J_M$. For each value of the magnitude of the orbital angular momentum $J_M$ during the flight, an interpolation method (as shown and described later) may be used by diagnostic module 130 to obtain the respective energy value for the pre-flight trajectory $E_{BET}$. This may allow diagnostic module 130 to calculate the delta values of energy E for the flight values of the magnitude of the orbital angular momentum $J_M$ using equation 6.

$$\Delta E(J_M) = E_{FT} - E_{BET} \quad (6)$$

It should be noted that equation 6 provides the energy difference between the flight trajectory $E_{FT}$ and the best estimate trajectory $E_{BET}$. However, in other embodiments, equation 6 may provide the energy difference between the best estimate trajectory $E_{BET}$ and the pre-flight trajectory $E_{PT}$, the energy difference between the best estimate trajectory $E_{BET}$ and the optimized trajectory $E_{OT}$, or the difference between any two trajectories that a person of ordinary skill in the art would like to compare. It should be appreciated that, in some embodiments, equation 6 may be utilized to obtain the energy difference between the best estimate trajectory $E_{BET}$ and the optimal trajectory $E_{OT}$ to ensure that the best estimate trajectory is close to the optimal trajectory. Similarly, the energy difference between the optimal trajectory and the pre-flight trajectory should be close.

Figure 3:
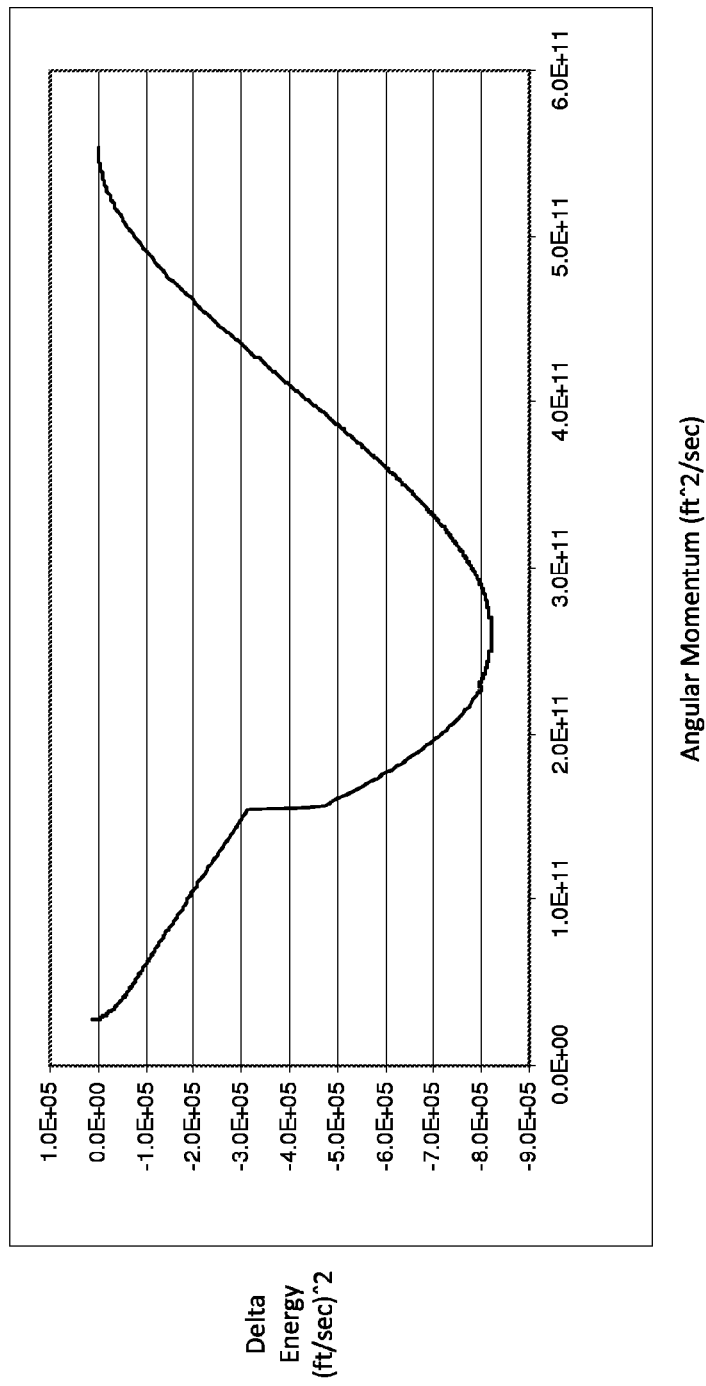
FIG. 3 is a graph illustrating energy difference between flight and pre-flight trajectories, according to an embodiment of the present invention.
Figure 4:
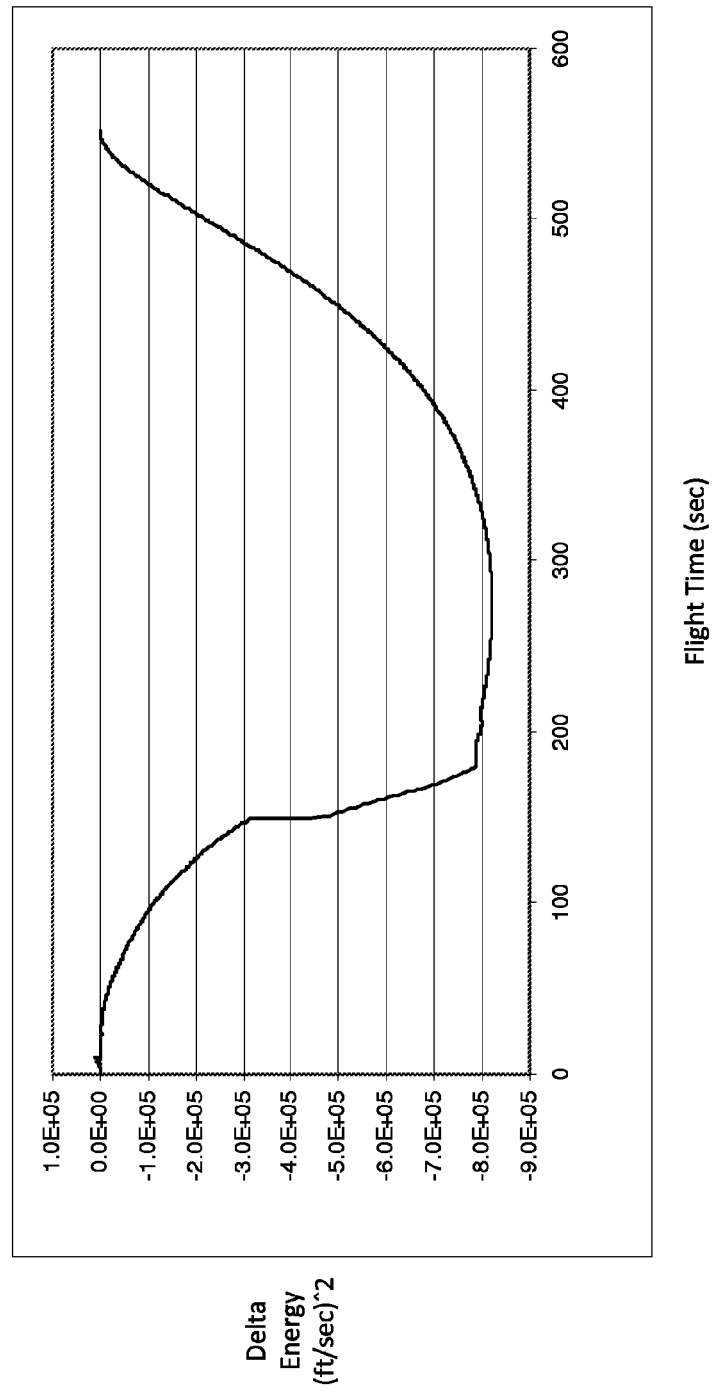
FIG. 4 is a graph illustrating energy difference as a function of flight time, according to an embodiment of the present invention.

FIG. 3 is a graph 300 illustrating the delta values of energy $\Delta E$ versus the magnitude of the orbital angular momentum $J_M$ for a test case trajectory comparison. For example, in FIG. 3, graph 300 shows that the vehicle's pre-flight energy and flight energy difference are initially zero (0). However, during ascent, the energy difference is –8.0 E+05 when the angular momentum is approximately 2.5 E+11. As the vehicle reaches orbit injection, the energy difference returns to zero (0). Stated differently, graph 300 shows that the flight trajectory energy is less than the pre-flight trajectory energy during ascent to orbit injection. FIG. 4 is a graph 400 illustrating the similar information as FIG. 3, but as a function of vehicle flight time for the flight trajectory, e.g., energy difference (or delta energy) as a function of time.

The inclination of the vehicle may also be obtained by diagnostic module 130. In one embodiment, the inclination ("INCL") for flight trajectory and best estimate trajectory may be obtained as the inverse cosine of the Z-axis component J(3)/the magnitude of the orbital angular momentum $J_M$.

$$INCL(J_M) = \cos^{-1}\left(\frac{J(3)}{J_M}\right) \quad (7)$$

The difference in inclination between flight trajectory $INCL_{FT}$ and $INCL_{BET}$ may be given by $$\Delta INCL(J_M) = INCL_{FT}(J_M) - INCL_{BET}(J_M) \quad (8)$$

Figure 5:
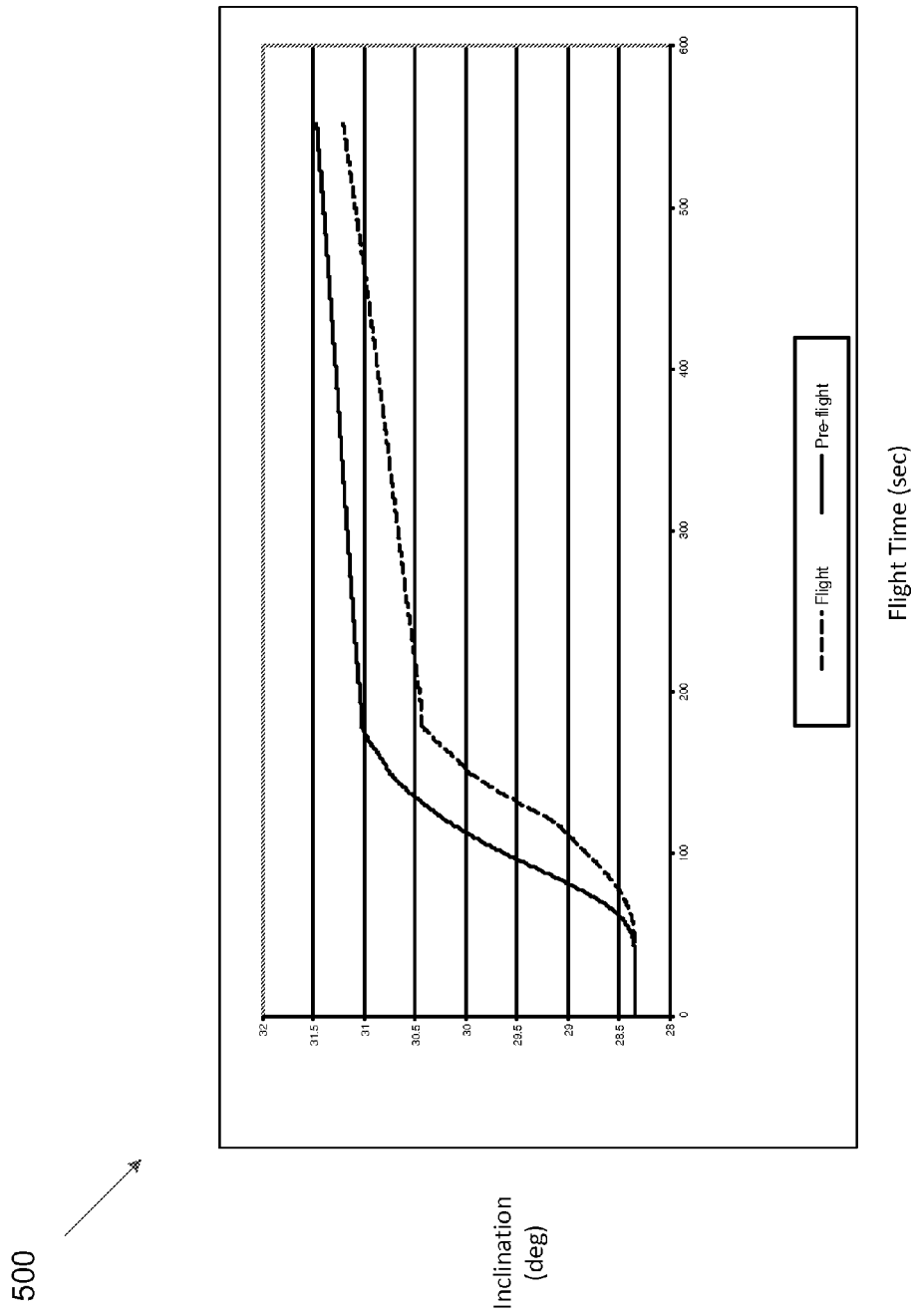
FIG. 5 is a graph illustrating inclination change during ascent, according to an embodiment of the present invention.
Figure 6:
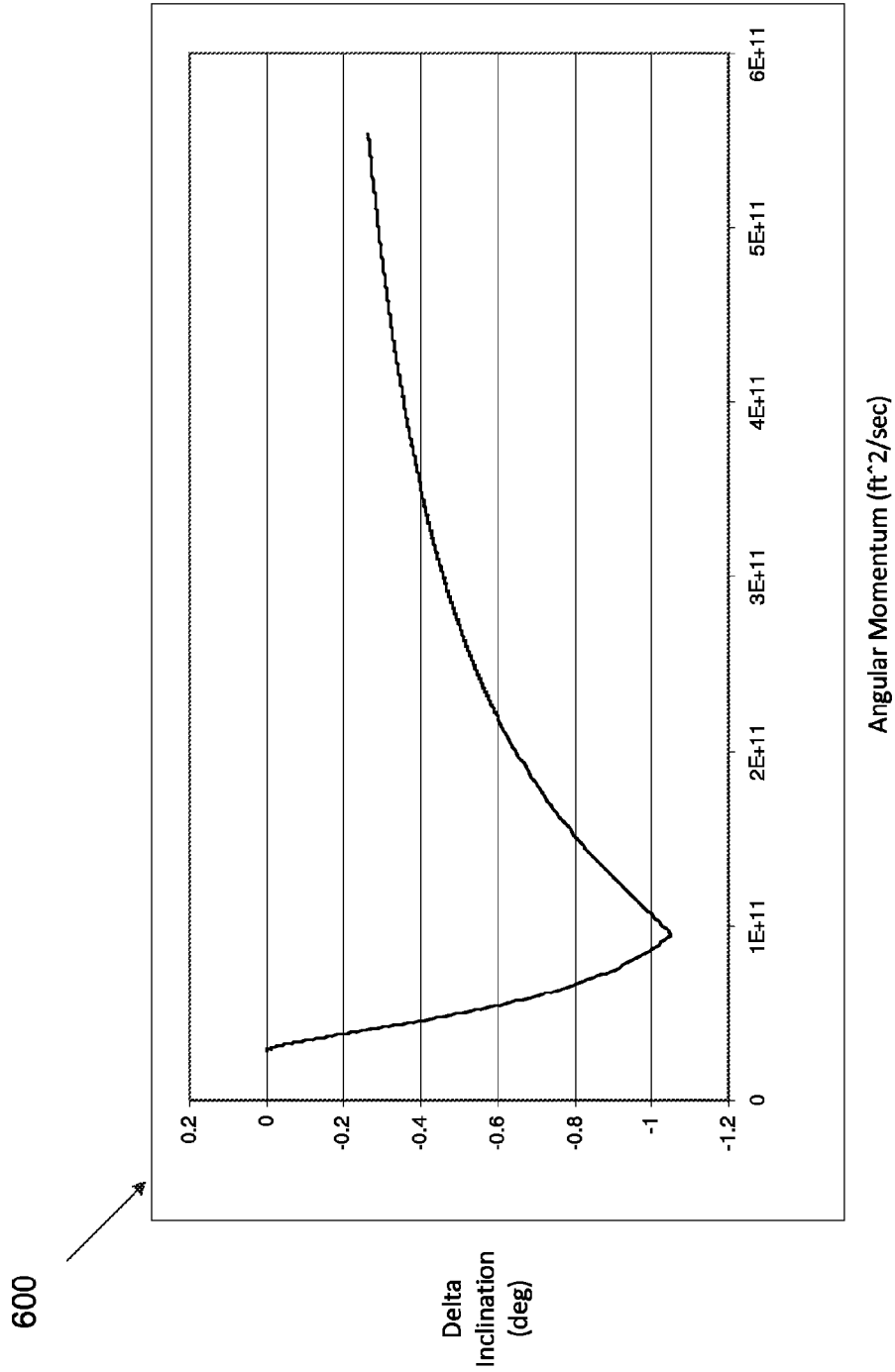
FIG. 6 is a graph illustrating difference in inclination between flight and pre-flight trajectories, according to an embodiment of the present invention.
Figure 7:
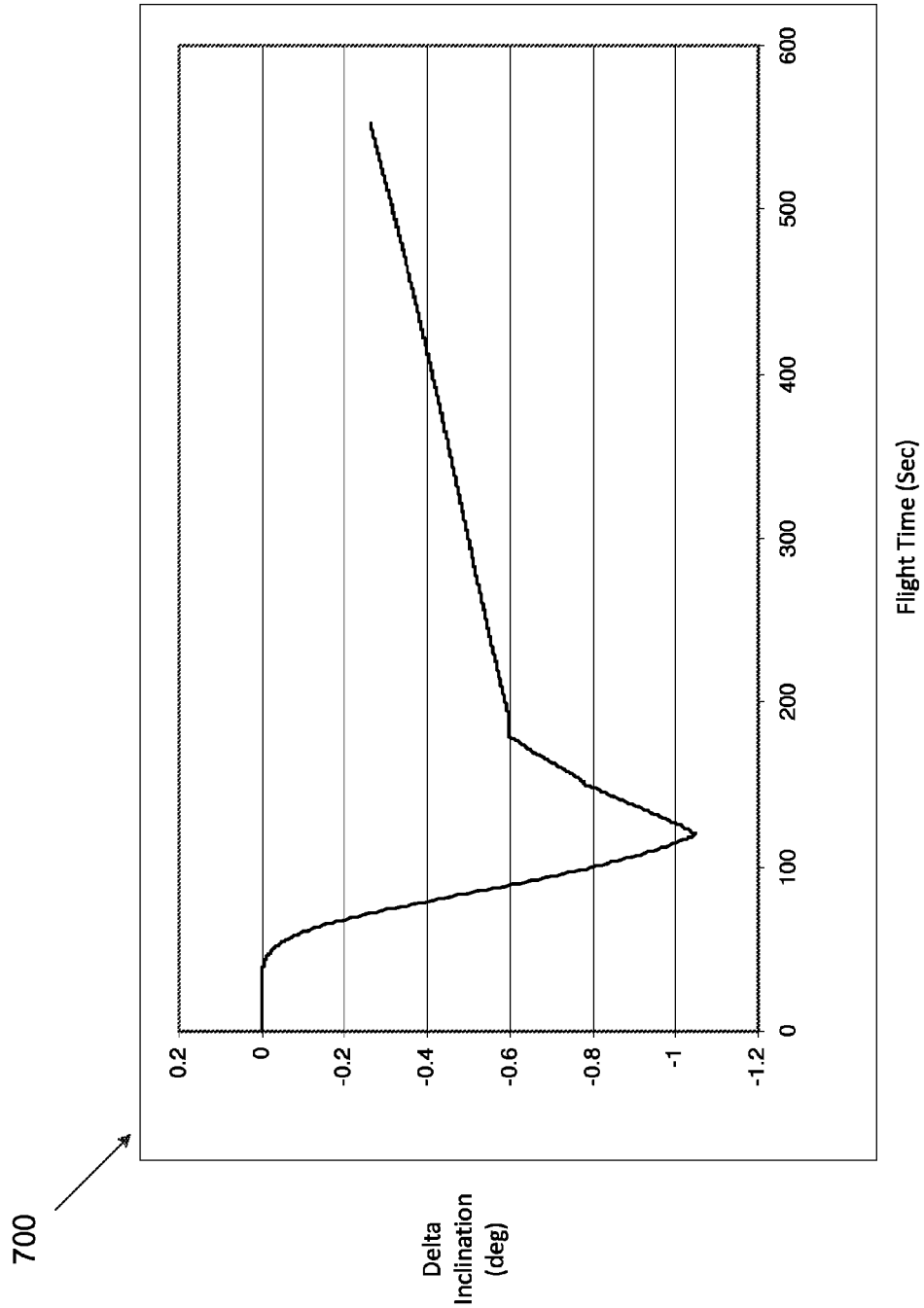
FIG. 7 is a graph illustrating inclination difference versus flight time, according to an embodiment of the present invention.

FIG. 5 is a graph 500 illustrating the inclination for both trajectories expressed as a function of time of the flight trajectory. For example, graph 500 shows that the flight trajectory deviates from the pre-flight trajectory. FIG. 6 is a graph 600 illustrating the difference in inclination as a function of angular momentum and FIG. 7 is a graph 700 illustrating the same information as FIG. 6, but plotted as a function of vehicle flight time for the flight trajectory. In this example, at orbital injection, the energy difference becomes zero (see FIGS. 3 and 4) but the inclination difference does not (see FIGS. 6 and 7).

Stated differently, FIGS. 2 through 7 illustrate how the energy—angular momentum diagnostic method uncovers both energy and inclination differences between the flight and pre-flight trajectories of the vehicle. The energy difference should be zero or near zero for the vehicle to attain the desired orbit.

It should be appreciated that other state vector parameters could also be plotted as a function of angular momentum or associated time for the flight trajectory. The pre-flight trajectory time generally cannot be used since time shifts tend to occur between flight and pre-flight trajectories.

Figure 8:
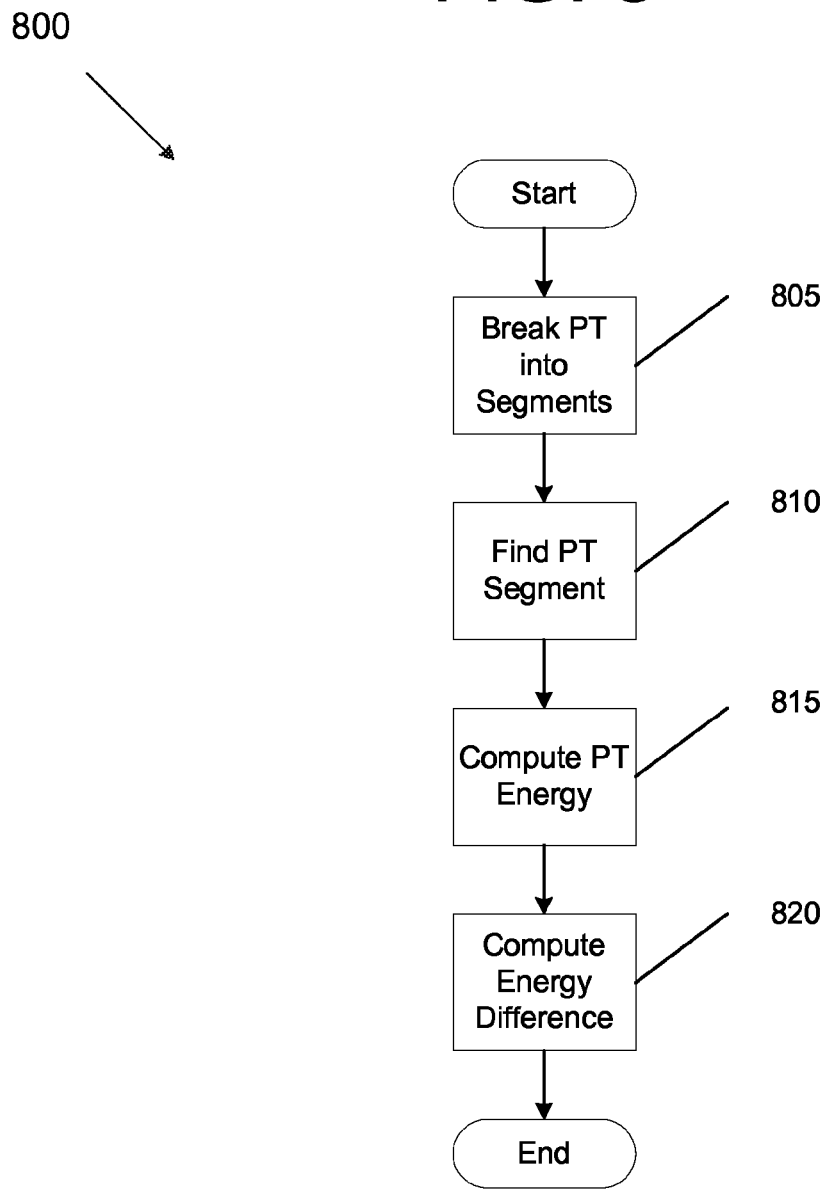
FIG. 8 is a flow diagram illustrating a curve fit process, according to an embodiment of the present invention.

FIG. 8 is a flow diagram illustrating a curve fit process 800, according to an embodiment of the present invention. In certain embodiments, vehicle performance dispersions and anomalies can be found by finding the difference in energy between the pre-flight trajectory and the flight trajectory for each value of angular momentum J of the flight trajectory during ascent to orbit. It should be appreciated that the discrete set of values of angular momentum J for the pre-flight trajectory is not precisely the same as that of the values of angular momentum J for the flight trajectory. However, diagnostic module 130 of FIG. 1, for example, may use a curve fitting process (or an interpolation process, see FIG. 9) to find pre-flight trajectory energy values that correspond to the flight trajectory angular momentum values. At 805, the pre-flight trajectory is broken into segments, where each segment is represented by a low order polynomial. Once a value of angular momentum J is obtained from the flight trajectory, the pre-flight trajectory segment containing the value of the angular momentum J is found at 810. When the value of the angular momentum J is found in the $i^{th}$ pre-flight trajectory segment, the associated energy may be computed at 815 using equation (8).

$$E_{PT}(J) = C_{1i} + C_{2i}J + C_{3i}J^2 + C_{4i}J^3 \tag{8}$$

where $E_{PT}$ is the energy of the pre-flight trajectory associated with the angular momentum J, and $C_{ni}$ are the polynomial coefficients for the $i^{th}$ segment of the pre-flight trajectory. This process may be automated in a computer simulation, for example, to quickly obtain the required values of $E_{PT}$ for all values of the angular momentum J. Since $E_{FT}(J)$ may be known by receiving the telemetry data from the vehicle and the difference in energy $\Delta E(J)$ may be computed at 820 using equation (9).

$$\Delta E(J) = E_{FT}(J) - E_{PT}(J) \tag{9}$$

Figure 9:
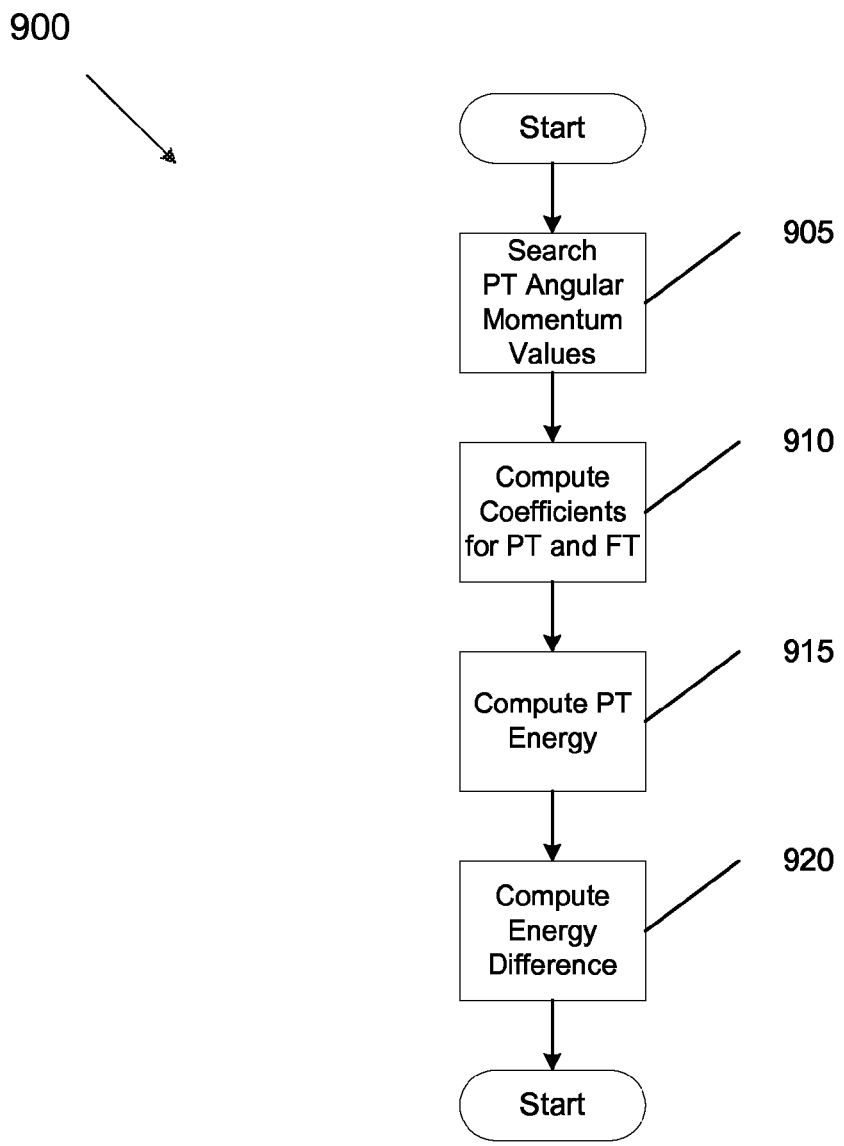
FIG. 9 is a flow diagram illustrating an interpolation process, according to an embodiment of the present invention.

FIG. 9 is a flow diagram 900 illustrating an interpolation process, according to an embodiment of the present invention. Instead of using a curve fitting process, an interpolation process may be used to obtain the needed values of pre-flight trajectory energy $E_{PT}$. For example, in this embodiment, $E_{FT}$ and $J_{FT}$ may be the energy and angular momentum values associated with the flight trajectory, while $E_{PT}$ and $J_{PT}$ may be the energy and angular momentum values associated with the pre-flight trajectory. Thus, for the $k^{th}$ value of flight trajectory angular momentum $J_{FTK}$, the associated energy of flight trajectory may be $E_{FTK}$.

Figure 10:
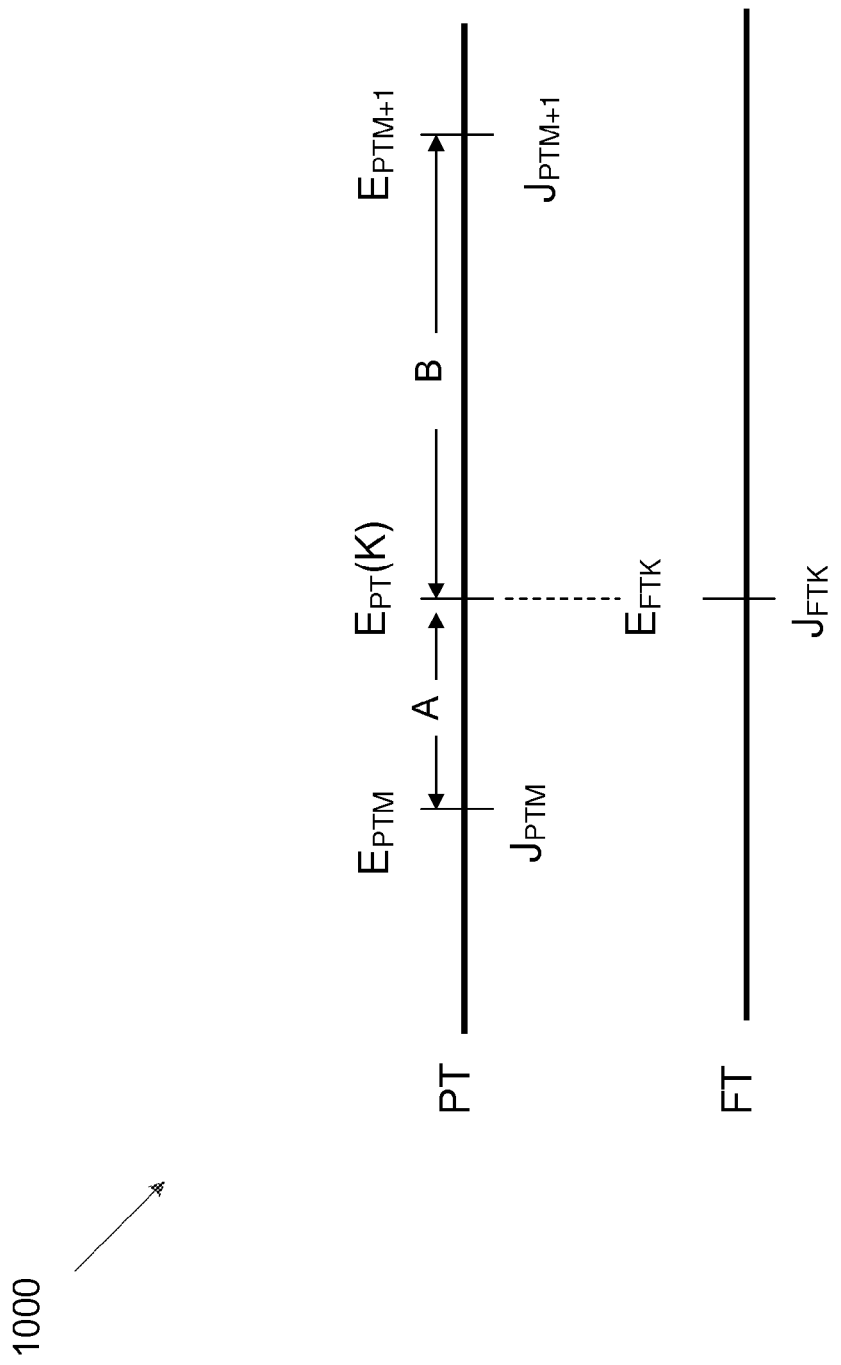
FIG. 10 is a diagram illustrating interpolation of pre-flight trajectory to obtain $E_{PT}(K)$ using $J_{FTK}$ from the flight trajectory, according to an embodiment of the present invention.

Two sequential angular momentum values of the pre-flight trajectory $J_{PT}$ may be searched at 905 until the flight trajectory angular momentum value $J_{FTK}$ is between the two sequential values as illustrated in, for example, diagram 1000 of FIG. 10.

$$J_{PTM} \leq J_{FTK} \leq J_{PTM+1} \tag{10}$$

A difference (coefficient A) between a first value of the sequential angular momentum $J_{PTM}$ and a flight trajectory angular momentum value $J_{FTK}$ may be found at 910, as well as a difference (coefficient B) between a second value of the sequential angular momentum $J_{PTM+1}$ and the flight trajectory angular momentum value $J_{FTK}$ may be found. The coefficients A and B may be computed at 910 using equations 11 and 12, respectively.

$$A = J_{PTM} - J_{FTK} \tag{11}$$

$$B = J_{FTK} - J_{PTM+1} \tag{12}$$

The value of the pre-flight trajectory energy $E_{PT}$ that corresponds to the flight trajectory angular momentum $J_{FTK}$ may be calculated at 915 using equation 13.

$$E_{PT}(K) = \frac{A(E_{PTM+1}) + B(E_{PTM})}{A+B} \tag{13}$$

Finally, the energy difference between the pre-flight trajectory and the flight trajectory for $J_{FTK}$ may be calculated at 920 using equation 14.

$$\Delta E(K) = E_{FTK} - E_{PT}(K) \tag{14}$$

In a similar fashion, the curve fit process or the interpolation process can be used on other flight parameters to obtain the differences between flight trajectory and pre-flight trajectory values.

Figure 11:
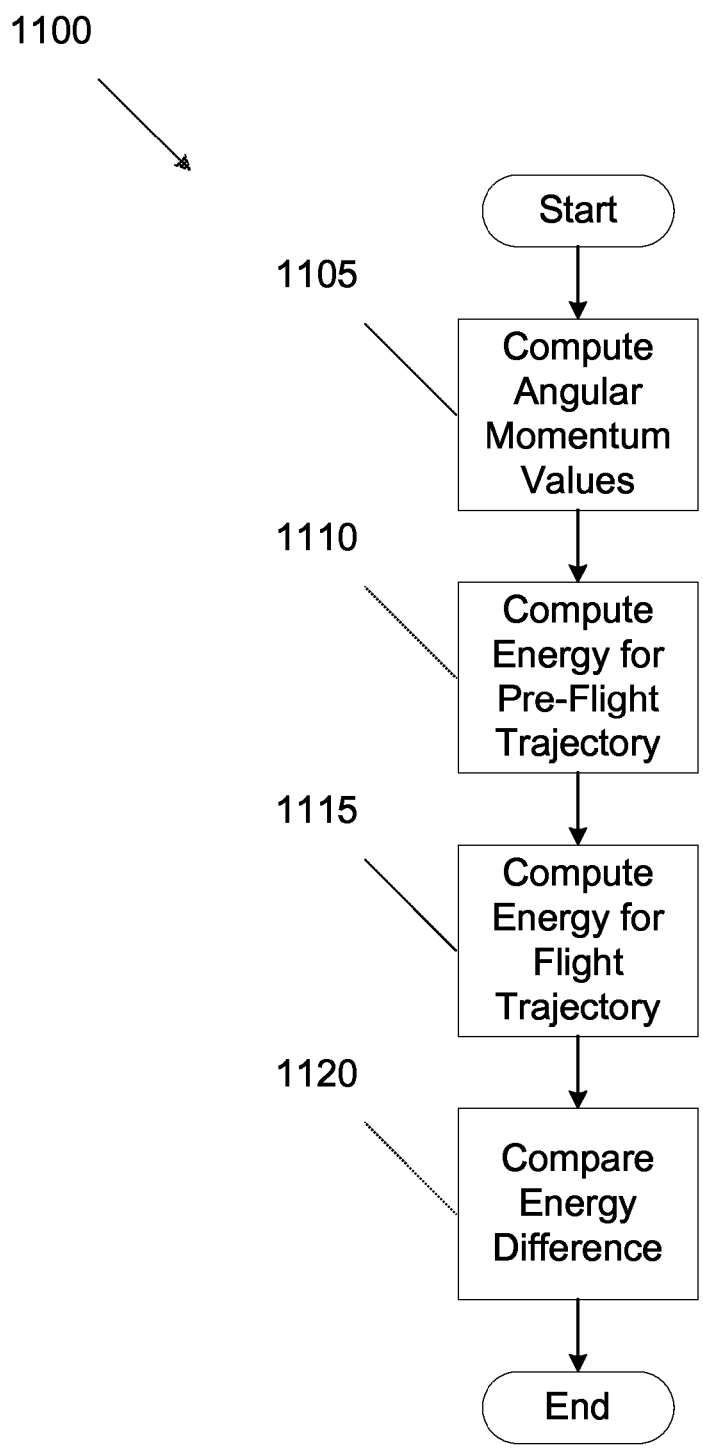
FIG. 11 is a flow diagram illustrating a process for comparing a difference in energy, according to an embodiment of the present invention.

FIG. 11 is a flow diagram 1100 illustrating a process for comparing a difference in energy, according to an embodiment of the present invention. The process of FIG. 11 may be executed by diagnostic module 130 of FIG. 1, for example. The process may begin at 1105 with computing the angular momentum of the vehicle's flight trajectory based on an inertial navigation unit inertial position and velocity. In particular, the angular momentum of the vehicle's flight trajectory may be computed. It should be appreciated that the angular momentum in certain embodiments may be computed based on flight telemetry values received during the flight of the vehicle or after the vehicle has reached its target. At 1110, the diagnostic module may compute the energy of the vehicle's pre-flight trajectory based on inertial position and velocity of the pre-flight trajectory, as well as gravity and mass of the Earth. At 1115, the diagnostic module may also compute the energy of the vehicle's flight trajectory based on position and velocity received from the vehicle's inertial navigation unit, as well as the gravity and mass of Earth. At 1120, the energy difference between the vehicle's flight trajectory and pre-flight trajectory are compared to expected results or family history to determine any anomalies during the vehicle's flight.

Figure 12:
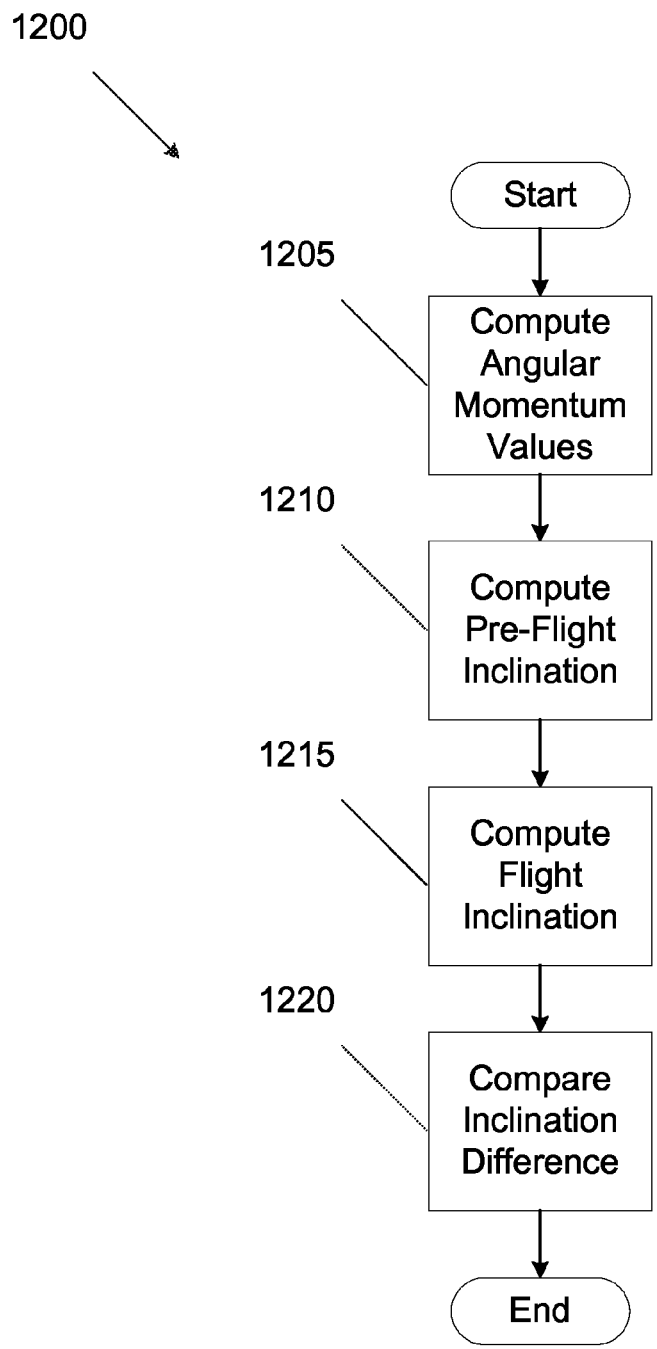
FIG. 12 is a flow diagram illustrating a process for computing a difference of inclination of a vehicle's flight, according to an embodiment of the present invention.

FIG. 12 is a flow diagram 1200 illustrating a process for computing a difference of inclination of a vehicle's flight, according to an embodiment of the present invention. The diagnostic module 130 of FIG. 1, for example, may execute the process of FIG. 12. The process may begin at 1205 with computing the angular momentum values of the vehicle's flight trajectory, and computing at 1210 pre-flight trajectory inclination associated with the angular momentum of the vehicle's flight trajectory. At 1215, a flight trajectory inclination may be computed based on the inertial position and velocity received from the vehicle's inertial navigation unit. At 1220, the inclination differences for associated values of angular momentum are computed to determine the difference in inclination between the vehicle's pre-flight trajectory and flight trajectory.

It should be appreciated that the processes described in FIGS. 8, 9, 11, and 12 may be carried out on the vehicle or at a central command station on Earth. The processes shown in FIGS. 8, 9, 11, and 12 may be performed, in part, by a computer program, encoding instructions for a nonlinear adaptive processor to cause at least the processes described in FIGS. 8, 9, 11, and 12 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 8, 9, 11, and 12, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One or more embodiments pertain to a diagnostic method to determine the performance of a vehicle. For example, the method may utilize pre-flight trajectory having an energy-angular momentum plane with a flight trajectory having an energy-angular momentum plane, and compare the pre-flight trajectory and the flight trajectory, at each value of angular momentum, to determine the energy difference. The diagnostic method may also determine the inclination angle difference by comparing the pre-flight trajectory with the flight trajectory. Other parameter differences, such as velocity, temperature, propellant loading, etc., can be determined using the diagnostic method.

The diagnostic method may facilitate post-flight analyses by quickly locating where in the vehicle trajectory suboptimal performance occurred. The severity of the underperformance can be ascertained by comparison with family history, since the diagnostic method can be applied to historical flight data where both flight and pre-flight data are available. Although, trajectory parameters are evaluated as functions of orbital angular momentum, the associated flight times are available from the flight trajectory.

The diagnostic method may be used immediately following a launch to assess performance and identify problems that could affect subsequent launches of similar vehicles. The diagnostic method can be applied to sub-orbital or ballistic missile trajectories where flight trajectories are compared to desired pre-flight trajectories. The pre-flight trajectory need not be optimized to use the diagnostic method, since the diagnostic method simply determines the deviations of the flight trajectory from the planned pre-flight trajectory.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
computing, by a processor, energy for a pre-flight trajectory of a vehicle using angular momentum of the vehicle; and
comparing, by the processor, a difference in energy between the energy for the pre-flight trajectory of the vehicle and energy for a flight trajectory of the vehicle to detect anomalous vehicle behavior for correction of future launches, wherein
the energy for the flight trajectory of the vehicle is computed based on position and velocity vectors received from an inertial navigation unit after completion of the flight.

2. The computer-implemented method of claim 1, further comprising:
computing, by the processor, the angular momentum of the vehicle using an Earth-centered inertial position and velocity of the vehicle.

3. The computer-implemented method of claim 2, further comprising:
computing, by the processor, a magnitude of the angular momentum of the vehicle.

4. The computer-implemented method of claim 3, further comprising:
computing, by the processor, the energy for the pre-flight trajectory of the vehicle using Earth-centered inertial position, velocity, a universal gravitational constant, and a mass of Earth.

5. The computer-implemented method of claim 3, further comprising:
computing, by the processor, the energy for the flight trajectory of the vehicle using Earth-centered inertial position and velocity, a universal gravitational constant, and a mass of Earth.

6. The computer-implemented method of claim 1, further comprising:
computing, by the processor, the energy difference between the pre-flight trajectory of the vehicle and the flight trajectory of the vehicle using a magnitude of the angular momentum of the vehicle.

7. The computer-implemented method of claim 1, further comprising:
computing, by the processor, the energy difference as a function of flight trajectory time between the pre-flight trajectory of the vehicle and the flight trajectory of the vehicle using a magnitude of the angular momentum of the vehicle.

8. The computer-implemented method of claim 1, further comprising:
computing, by the processor, a difference in inclination between the pre-flight trajectory of the vehicle and the flight trajectory of the vehicle using a magnitude of the angular momentum of the vehicle.

9. A computer-implemented method, comprising:
computing, by a processor, pre-flight trajectory energy values that correspond to flight trajectory angular momentum values of a vehicle; and
comparing, by the processor, a difference in energy values between the pre-flight trajectory energy values and flight trajectory energy values of the vehicle to detect anomalous vehicle behavior for correction of future launches, wherein
the flight trajectory energy values of the vehicle are computed based on position and velocity vectors received from an inertial navigation unit after completion of the flight.

10. The computer-implemented method of claim 9, further comprising:
receiving, by the processor, telemetry data comprising inertial navigation unit based inertial position and velocity; and
computing, by the processor, the flight trajectory angular momentum values of the vehicle.

11. The computer-implemented method of claim 10, further comprising:
computing, by the processor, the flight trajectory energy values that correspond to the flight trajectory angular momentum values of the vehicle.

12. The computer-implemented method of claim 9, further comprising:
dividing, by the processor, the pre-flight trajectory of the vehicle into a plurality of segments, wherein
each of the plurality of segments is represented with a low order polynomial of energy as a function of angular momentum.

13. The computer-implemented method of claim 12, further comprising:
computing, by the processor, the energy values of the pre-flight trajectory using each of the plurality of segments with an associated low order polynomial.

14. The computer-implemented method of claim 9, further comprising:
searching for two sequential angular momentum values of the pre-flight trajectory such that flight trajectory angular momentum value is between the two sequential angular momentum values; and
computing, by the processor, the energy of the pre-flight trajectory using the two sequential angular momentum values and the flight trajectory angular momentum value.

15. The computer-implemented method of claim 9, further comprising:
computing, by the processor, pre-flight trajectory inclination values that correspond to flight trajectory angular momentum values of a vehicle; and
comparing, by the processor, a difference in inclination values between the pre-flight trajectory inclination values and the flight trajectory inclination values of the vehicle.

16. An apparatus, comprising:
at least one processor; and
memory comprising computer program code, wherein
the computer program code, together with the at least one processor, are configured to cause the apparatus to
compute pre-flight trajectory energy values that correspond to flight trajectory angular momentum values of a vehicle; and
compare a difference in energy values between the pre-flight trajectory energy values and flight trajectory energy values of the vehicle to detect anomalous vehicle behavior for correction of future launches, wherein
the flight trajectory energy values of the vehicle are computed based on position and velocity vectors received from an inertial navigation unit after completion of the flight.

17. The apparatus of claim 16, wherein the computer program code, together with the at least one processor, are further configured to cause the apparatus to receive telemetry data comprising inertial navigation unit based inertial position and velocity, and compute the flight trajectory angular momentum values of the vehicle.

18. The apparatus of claim 17, wherein the computer program code, together with the at least one processor, are further configured to cause the apparatus to compute the flight trajectory energy values that correspond to the flight trajectory angular momentum values of the vehicle.

19. The apparatus of claim 16, wherein the computer program code, together with the at least one processor, are further configured to cause the apparatus to:
divide the pre-flight trajectory of the vehicle into a plurality of segments, wherein
each of the plurality of segments is represented by a low order polynomial of energy as a function of angular momentum.

20. The apparatus of claim 19, wherein the computer program code, together with the at least one processor, are further configured to cause the apparatus to compute the energy values of the pre-flight trajectory using each of the plurality of segments with an associated low order polynomial.

21. The apparatus of claim 16, wherein the computer program code, together with the at least one processor, are further configured to cause the apparatus to search for two sequential angular momentum values of the pre-flight trajectory such that flight trajectory angular momentum value is between the two sequential angular momentum values, and compute the energy of the pre-flight trajectory using the two sequential angular momentum values and the flight trajectory angular momentum value.

22. The apparatus of claim 16, wherein the computer program code, together with the at least one processor, are further configured to cause the apparatus to
compute pre-flight trajectory inclination values that correspond to flight trajectory angular momentum values of a vehicle; and
compare a difference in inclination values between the pre-flight trajectory inclination values and the flight trajectory inclination values of the vehicle.

* * * * *